US011520087B2

United States Patent
Forcht et al.

(10) Patent No.: US 11,520,087 B2
(45) Date of Patent: Dec. 6, 2022

(54) REFLECTIVE OPTICAL ELEMENT

(71) Applicant: Carl Zeiss SMT GmbH, Oberkochen (DE)

(72) Inventors: Konstantin Forcht, Aalen (DE); Alexandra Pazidis, Essingen-Lautenburg (DE); Christoph Zaczek, Heubach (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 31 days.

(21) Appl. No.: 17/145,879

(22) Filed: Jan. 11, 2021

(65) Prior Publication Data
US 2021/0132269 A1    May 6, 2021

Related U.S. Application Data

(63) Continuation of application No. PCT/EP2019/068535, filed on Jul. 10, 2019.

(30) Foreign Application Priority Data

Jul. 11, 2018 (DE) .......................... 102018211499.4

(51) Int. Cl.
    *G02B 5/08* (2006.01)
(52) U.S. Cl.
    CPC .................. *G02B 5/0891* (2013.01)
(58) Field of Classification Search
    CPC ...... G02B 5/0891; G02B 5/08; G02B 5/0808; G02B 5/0833; G02B 5/085; G02B 5/0858; G03F 7/70; G03F 7/702; G03F 7/70058

(Continued)

(56) References Cited

U.S. PATENT DOCUMENTS

| 4,856,019 A | 8/1989 | Miyata et al. |
| 5,307,395 A | 4/1994 | Seely et al. |

(Continued)

FOREIGN PATENT DOCUMENTS

| DE | 3886067 T2 | 6/1994 |
| DE | 102005016591 A1 | 10/2006 |

(Continued)

OTHER PUBLICATIONS

German Office Action with English translation, Application No. 102018211499.4, dated Feb. 11, 2019, 12 pages.

(Continued)

*Primary Examiner* — Stephone B Allen
*Assistant Examiner* — Jyotsna V Dabbi
(74) *Attorney, Agent, or Firm* — Edell, Shapiro & Finnan, LLC

(57) ABSTRACT

Reflective optical element with extended service life for VUV wavelengths includes a substrate (41) and a metal layer (49) thereon. At least one metal fluoride layer (43) on the metal layer faces away from the substrate and at least one oxide layer (45) on the metal fluoride layer faces away from the substrate. The thicknesses of the layers on the metal layer facing away from the substrate are selected so that the electrical field of a standing wave, formed when a relevant wavelength is reflected, has a minimum in the region of the oxide layer. In addition, the relevant wavelength is selected so that, from a minimum VUV wavelength range to the relevant wavelengths, the integral over the extinction coefficients of the material of the at least one oxide layer is between 15% and 47% of the corresponding integral from the minimum wavelengths to a maximum wavelength.

8 Claims, 14 Drawing Sheets

(58) Field of Classification Search
USPC .......................................................... 359/838
See application file for complete search history.

(56) References Cited

U.S. PATENT DOCUMENTS

| | | | |
|---|---|---|---|
| 5,850,309 A * | 12/1998 | Shirai | G02B 5/0891 359/360 |
| 6,270,572 B1 | 8/2001 | Kim et al. | |
| 10,310,382 B2 | 6/2019 | Hermann | |
| 2010/0239822 A1 | 9/2010 | Pelizzo et al. | |
| 2017/0031067 A1 | 2/2017 | Quijada et al. | |
| 2018/0224586 A1 | 8/2018 | Weigl et al. | |
| 2019/0086580 A1 | 3/2019 | Von Finck et al. | |

FOREIGN PATENT DOCUMENTS

| | | | |
|---|---|---|---|
| DE | 102015218763 A1 | 3/2017 | |
| DE | 102016103339 A1 | 8/2017 | |
| DE | 102017213172 A1 | 9/2017 | |
| EP | 1227346 A2 | 7/2002 | |
| EP | 1351258 A1 | 10/2003 | |
| JP | 2011503654 A | 1/2011 | |
| JP | 2016531319 A | 10/2016 | |
| WO | 2006053705 A1 | 5/2006 | |
| WO | 2009062665 A2 | 5/2009 | |
| WO | WO-2017055133 A1 * | 4/2017 | ............. G02B 21/16 |

OTHER PUBLICATIONS

International Search Report, PCT/EP2019/068535, dated Sep. 26, 2019, 6 pages.
PCT International Preliminary Report on Patentability, PCT/EP2019/068535, dated Jan. 12, 2021, 7 pages.
TW Office Action, Application No. 2021-500715, dated Nov. 11, 2021, 5 pages.
Japanese Office Action with English translation, Application No. 2021-500715, dated Apr. 6, 2022, 5 pages.

* cited by examiner

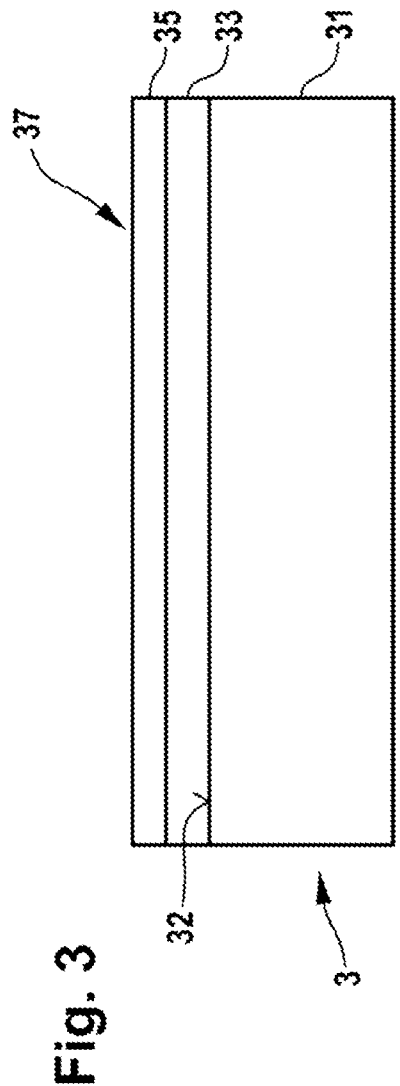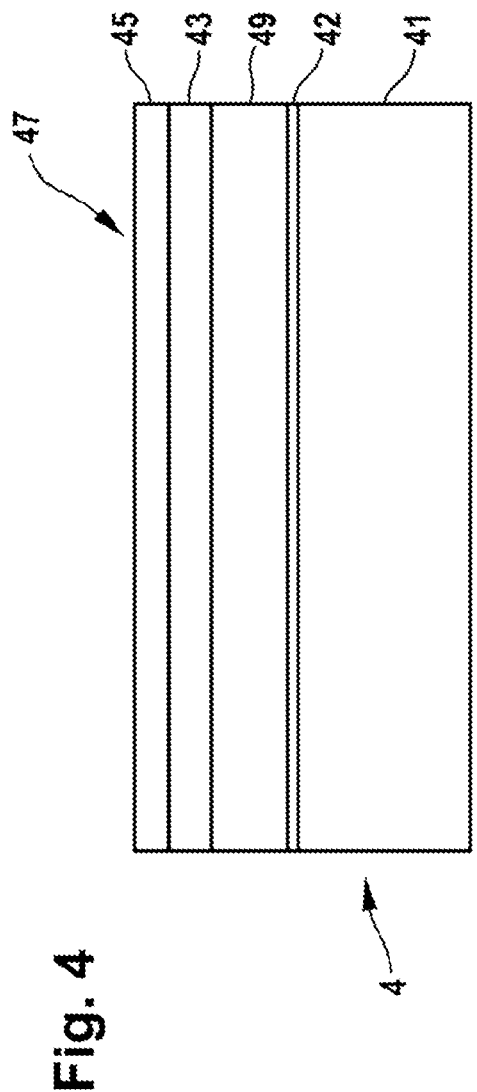

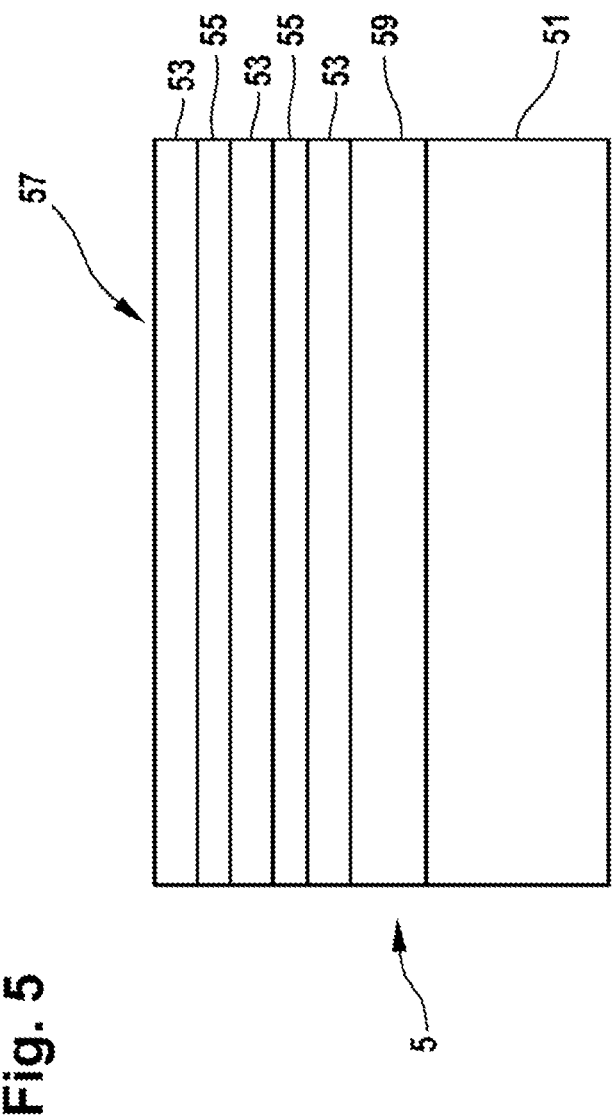

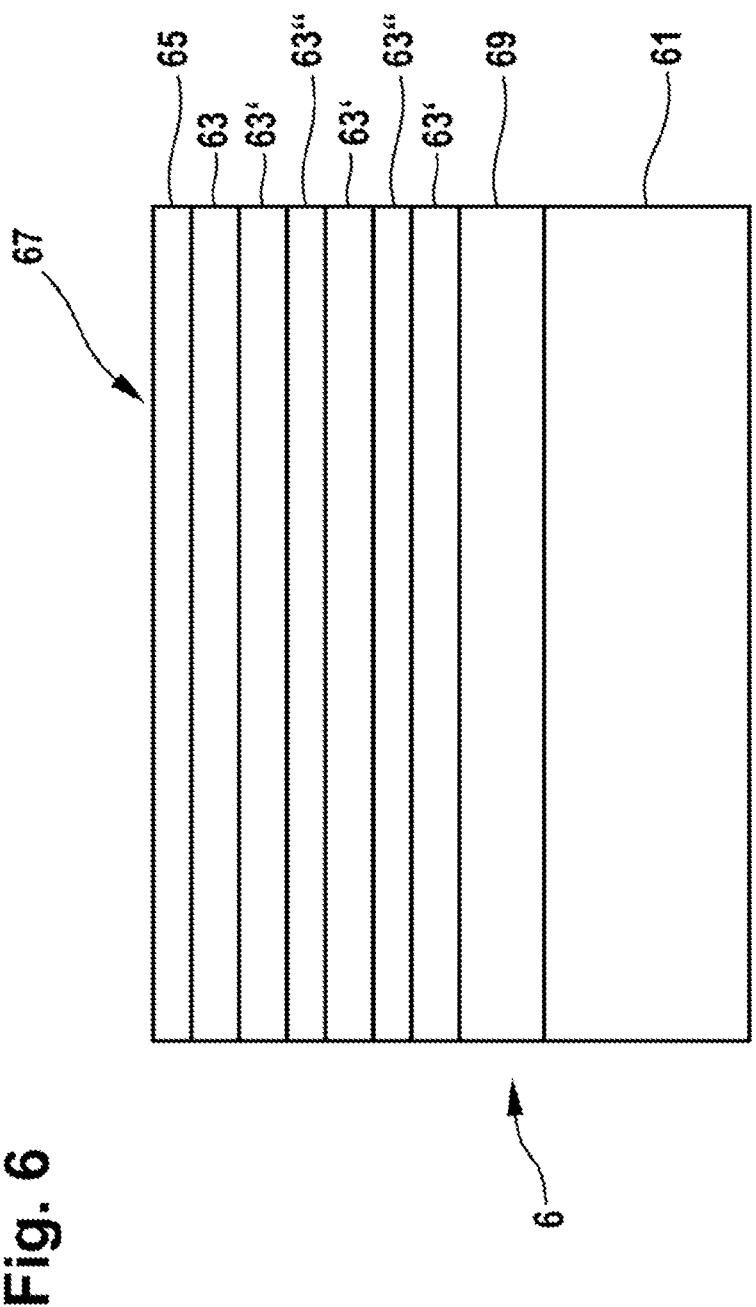

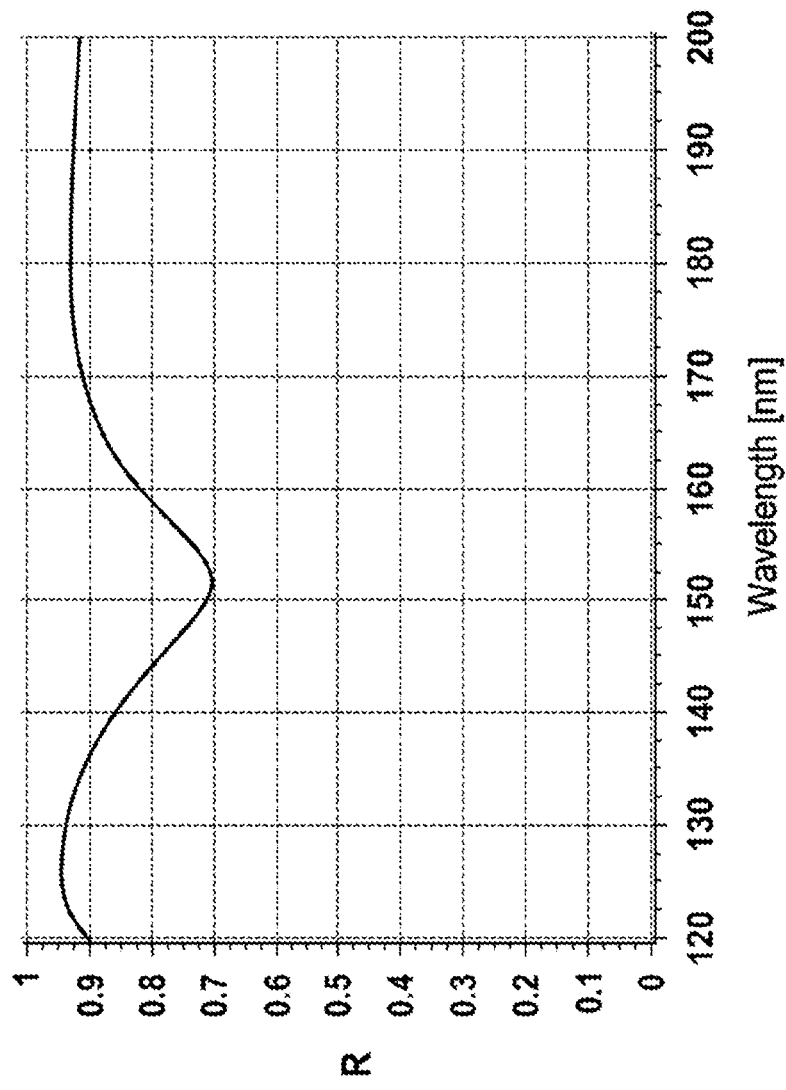

REFLECTIVE OPTICAL ELEMENT

CROSS REFERENCE TO RELATED APPLICATIONS

This is a Continuation of International Application PCT/EP2019/068535, which has an international filing date of Jul. 10, 2019, and which claims the priority of German Patent Application 10 2018 211 499.4, filed Jul. 11, 2018. The disclosures of both applications are incorporated in their respective entireties into the present Continuation by reference.

FIELD OF THE INVENTION

The present invention relates to a reflective optical element for a VUV wavelength range, comprising a substrate and a metal layer thereon.

BACKGROUND

Particularly in the relatively short-wave ultraviolet wavelength range between approximately 100 nm and 200 nm, also called vacuum ultraviolet radiation (VUV radiation), it is not possible just to employ transmissive optical elements. Rather, it is often necessary also to have recourse to reflective optical elements. Reflective optical elements comprising, on a substrate, a metallic layer and overlying that a protective layer or a highly reflective layer system have proved to be particularly worthwhile in this case. The protective layer or the protective layer system can comprise one or more fluorides. A method for producing such reflective optical elements is known from US 2017/0031067 A1, for example. It involves vapor depositing onto a substrate two first layers at room temperature and then a third layer at approximately 200° C.

It has been observed, however, that at high radiation intensities such as can occur in lithography and particularly also for the inspection of masks and wafers, already within a few days or even just a few hours, a severe degradation of the reflective optical elements can take place, accompanied by high loss of reflectivity, even if they comprise a protective layer and the irradiation takes place in a vacuum.

SUMMARY

It is an object of the present invention to propose a reflective optical element and a production method in which the lifetime of the element can be lengthened relative to conventional elements.

This object is achieved with a reflective optical element for a VUV wavelength range, comprising a substrate and a metal layer thereon, wherein said element comprises at least one metal fluoride layer on the side of the metal layer facing away from the substrate and at least one oxide layer on the side of said metal fluoride layer facing away from the substrate, wherein the thicknesses of the layers on the side of the metal layer facing away from the substrate are selected such that the electric field of a standing wave that forms upon reflection of an incident significant wavelength from the VUV wavelength range has a minimum in the region of the at least one oxide layer, wherein the significant wavelength is selected such that the integral over the extinction coefficient of the material of the at least one oxide layer from a minimum wavelength of the VUV wavelength range to the significant wavelength is between 15% and 47%, preferably between 18% and 44%, particularly preferably approximately 33%, of the corresponding integral from the minimum wavelength to a maximum wavelength of the VUV wavelength range.

It has been found that the absorption of the at least one oxide layer can be significantly reduced by positioning in a region of low field strength, in particular in the case of the design of the layer thicknesses for a significant wavelength as described, with the result that a possible loss of reflectivity on account of the at least one oxide layer can be reduced and the protective function of the oxide can thus be utilized particularly well. This is advantageous particularly for wavelengths below approximately 160 nm, at which oxide layers can result in relatively high losses of reflectivity. As a result, it is possible to increase the lifetime of the corresponding reflective optical element particularly in the case of irradiation with high power density, such as can occur for instance in lithography processes or the optical inspection of wafers and optical elements, including masks inter alia. Reflective optical elements of the type proposed here can be provided for use with arbitrary VUV wavelength bandwidths extending from individual wavelengths through to the entire VUV wavelength range.

Preferably, the metal layer of these reflective optical elements, which either was applied in a targeted manner or is formed by the surface of a metallic substrate, comprises aluminum, an aluminum-silicon alloy, an aluminum-manganese alloy, an aluminum-silicon-manganese alloy, rhodium, ruthenium, palladium, osmium, iridium, platinum, magnesium or a combination thereof. These materials reflect sufficiently well in the wavelength range between 100 nm and 200 nm.

Preferably, the metal fluoride layer comprises magnesium fluoride, aluminum fluoride, sodium fluoride, lithium fluoride, chiolite, cryolite, erbium fluoride, neodymium fluoride, gadolinium fluoride, dysprosium fluoride, samarium fluoride, holmium fluoride, hafnium fluoride, lanthanum fluoride, europium fluoride, lutetium fluoride, cerium fluoride, barium fluoride, yttrium fluoride or a combination thereof. These fluorides have a sufficiently low absorption in the wavelength range between 100 nm and 200 nm and at relatively low radiation intensity are sufficiently resistant to protect a metallic surface at which reflection of this radiation takes place against damage particularly as a result of oxidation.

Advantageously, the oxide layer comprises silicon dioxide, fluorine-doped silicon dioxide, aluminum oxide, magnesium oxide, lutetium oxide, calcium oxide, hafnium oxide, germanium oxide, tin oxide, zinc oxide, zirconium oxide, barium oxide, yttrium oxide, scandium oxide or a combination thereof. These oxides afford protection even at high radiation intensities, such as can occur in lithography processes or in inspection systems for wafers and masks, inter alia, against damage of the metallic surface, in particular as a result of oxidation.

Preferably, the substrate is composed of quartz, titanium-doped quartz glass, calcium fluoride, magnesium fluoride, ceramic, glass ceramic, silicon, silicon carbide, in particular reaction bonded silicon-silicon carbide composite material, aluminum, copper or aluminum-copper alloy. Other oxidic or non-oxidic ceramics are also suitable as substrate material. The substrate materials mentioned have low coefficients of thermal expansion, with the result that they have a good dimensional stability even at high radiation intensities. Cooled substrates are advantageous at particularly high radiation intensities. To that end, materials having sufficient good thermal conductivity are suitable, such as, for instance, crystalline or amorphous silicon, silicon carbide, reaction bonded silicon-silicon carbide composite materials, silicon nitride, silicon oxynitride, aluminum oxide, aluminum oxynitride, aluminum, copper or aluminum-copper alloy. Moreover, by polishing one of their surfaces, the metals proposed can be used directly for reflecting radiation from the wavelength range between 100 nm and 200 nm, without a separate metal layer being necessary.

Preferably, a functional layer is arranged between substrate and metal layer. The functional layer can also be embodied in multilayered fashion. It can perform one or more functions.

Particularly preferably, the functional layer is embodied as an adhesion promoter layer and/or a polishing layer. The lifetime of the reflective optical element can be lengthened through the adhesion promoter layer since the risk of layers detaching from the substrate can be reduced. The polishing layer can compensate for roughnesses of the substrate surface which continue through the applied layers and could lead to losses of reflectivity as a result of increased scattered radiation.

Advantageously, the functional layer comprises silicon, carbon, aluminum, nickel, cobalt, boron, tantalum, zirconium, tungsten, niobium, molybdenum, vanadium, chromium, copper, titanium, hafnium, their alloys, oxides, nitrides, borides, carbides or other compounds or a combination thereof.

A method for producing a reflective optical element for a VUV wavelength range is proposed, wherein at least one first and one second layer are applied to a substrate, wherein one of the two layers is a metal fluoride layer and the other is an oxide layer. It has been found that reflective optical elements for wavelengths in the range of 100 nm to 200 nm, preferably 120 nm to 190 nm, can be obtained in this way, which elements have an improved lifetime. All known coating processes are suitable in principle, such as, for instance, for example inter alia magnetron sputtering, ion-assisted deposition, plasma-enhanced deposition, thermal evaporation, etc. By comparison with the metal fluoride layers exclusively used hitherto, oxide layers have the advantage that they can be produced more simply and by way of a greater multiplicity of possible types of coating. In particular, even denser and/or thinner layers can be produced well on the basis of oxides.

In preferred variants, this reflective optical element can be produced using atomic layer deposition (also called ALD). Particularly dense and thus resistant layers, for example against oxidation, can be produced with atomic layer deposition. Atomic layer deposition also allows particularly thin and smooth layers to be deposited and losses of reflectivity on account of absorption and scattering to be reduced in this way. Atomic layer deposition is known in DE 198 53 598 A1, for example, to the entirety of which reference is made. Moreover, with atomic layer deposition, the layer thicknesses can be controlled particularly well and the at least one oxide layer can thus be positioned particularly precisely at a minimum of a standing wave that forms upon reflection.

Optionally, a metal fluoride can be applied as first layer and an oxide, preferably a metal oxide, can be applied as second layer. The oxide of the second layer makes it possible to achieve a particularly good protective function including of the underlying first layer composed of metal fluoride, wherein the reflectivity can be optimized by adapting the thicknesses of the first and second layers.

In one preferred variant, a metal layer can be applied to the substrate before the first layer is applied. This is advantageous particularly in the case of nonmetallic substrates. In the case of metallic substrates, the surface thereof could also be polished, with the result that the highest possible reflectivity occurs at said surface. Particularly preferably, the metal layer is vapor deposited by the corresponding material being heated in the vacuum.

As an optional step, before the first layer is applied, with atomic layer deposition, a metal fluoride layer can be applied to the substrate or to the metal layer. This is advantageous in terms of production engineering since the metal fluoride layer as it were seals the metal layer or the substrate surface, particularly in the case of a metallic substrate, and prevents contamination of the metallic surface if the substrate has to be brought into a special coating chamber for applying the first and second layers with atomic layer deposition. Particularly preferably, the metal fluoride layer is vapor deposited by the corresponding metal fluoride being heated in the vacuum.

Optionally, in addition or as an alternative to the metal layer, a dielectric layer system can be applied before or after the at least first and second layers are applied, wherein the dielectric layer system comprises at least one layer composed of a material having a lower refractive index at the operating wavelength and at least one layer composed of a material having a higher refractive index at the operating wavelength. The dielectric layer system can serve to increase the reflectivity particularly in narrow wavelength ranges.

BRIEF DESCRIPTION OF THE DRAWINGS

The present invention will be explained in greater detail with reference to preferred exemplary embodiments. In this respect:

FIG. 3 shows a schematic illustration of a first reflective optical element;

FIG. 4 shows a schematic illustration of a second reflective optical element;

FIG. 5 shows a schematic illustration of a third reflective optical element;

FIG. 6 shows a schematic illustration of a fourth reflective optical element;

FIG. 16 shows the reflectivity of a reflective optical element as a function of wavelength for one embodiment of the fourth layer arrangement from FIG. 15.

DETAILED DESCRIPTION

Figure 1:
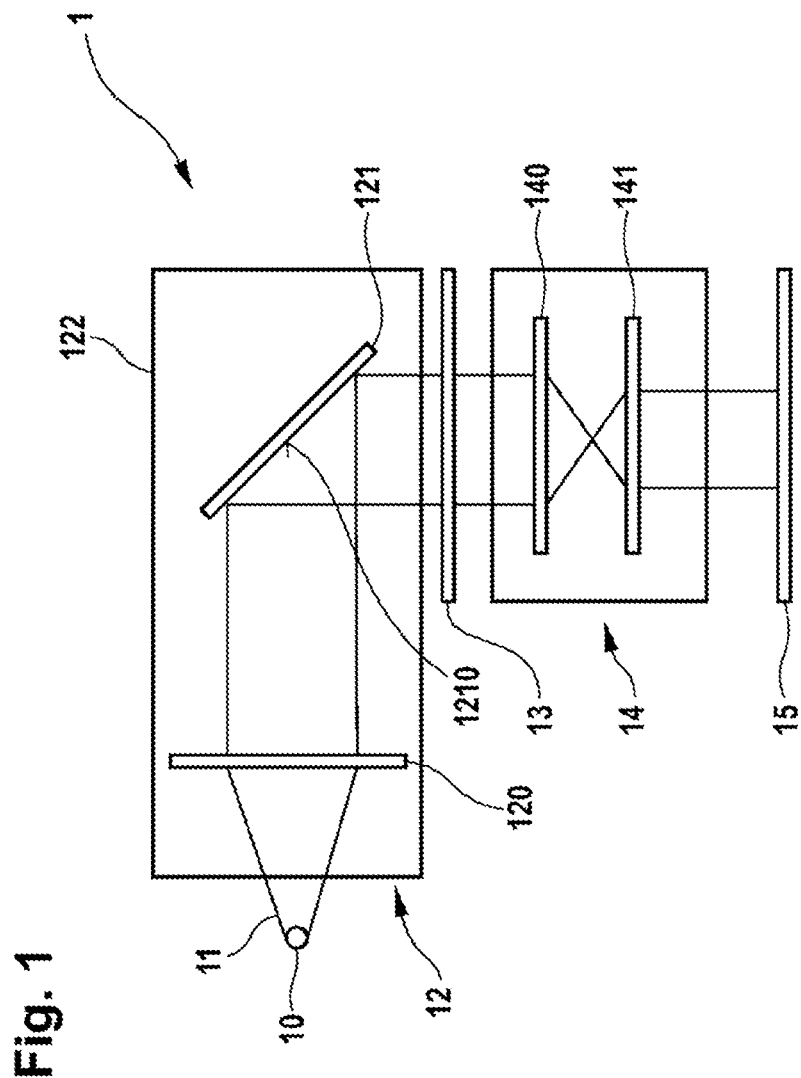
FIG. 1 shows a schematic illustration of an apparatus for VUV lithography.

FIG. 1 shows a schematic basic diagram of an apparatus 1 for VUV lithography, in particular for wavelengths in the range of 100 nm to 200 nm. The VUV lithography apparatus 1 comprises as primary constituent parts, in particular, two optical systems 12, 14, namely an illumination system 12 and a projection system 14. Carrying out lithography necessitates a radiation source 10, particularly preferably an excimer laser, which emits for example at 193 nm, 157 nm or 126 nm and which can be an integral part of the VUV lithography apparatus. The radiation 11 emitted by the radiation source 10 is conditioned with the aid of the illumination system 12 such that a mask 13, also called a reticle, can be illuminated thereby. In the example illustrated here, the illumination system 12 comprises transmissive and reflective optical elements. The transmissive optical element 120, which focuses the radiation 11, for example, and the reflective optical element 121, which deflects the radiation, for example, are illustrated here in representative fashion. In a known manner, in the illumination system 12, a wide variety of transmissive, reflective and other optical elements can be combined with one another in various, even more complex, arrangements.

The mask 13 has a structure on its surface, said structure being transferred to an element 15 to be exposed, for example a wafer in the context of the production of semiconductor components, with the aid of the projection system 14. In the present example, the mask 13 is embodied as a transmissive optical element. In further embodiments, it can also be configured as a reflective optical element. The projection system 14 comprises at least one transmissive optical element in the example illustrated here. In the example illustrated here, two transmissive optical elements 140, 141 are illustrated in representative fashion, which serve for example in particular to reduce the structures on the mask 13 to the size desired for the exposure of the wafer 15. In the projection system 14, too, inter alia reflective optical elements can be provided and a wide variety of optical elements can be combined with one another in various arrangments in a known manner. It should be pointed out that optical systems without transmissive optical elements can also be used.

The reflective optical element 121 is a mirror having a reflective surface 1210 having a metal reflective coating. In order to be able to be used with good reflectivity in particular over a wide wavelength range, for example 100 nm to 200 nm, a metal layer composed of aluminum has proved worthwhile as the metal reflective coating. Further suitable metals are noble metals and platinum metals, particularly for use with grazing incidence. It should be pointed out that, in connection with the example illustrated in FIG. 1, although only one reflective optical element 121 for the vacuum ultraviolet wavelength range, in particular, is discussed, two, three, four, five or more optical elements of this type can be provided in an optical system for VUV lithography, for instance. In particular, the reflective optical element(s) is/are reflective optical elements for a VUV wavelength range, which include a substrate and a metal layer thereon. This/these element(s) comprise(s) at least one metal fluoride layer on the side of the metal layer facing away from the substrate and at least one oxide layer on the side of the metal fluoride layer facing away from the substrate. The thicknesses of the layers on the side of the metal layer facing away from the substrate are selected such that the electric field of a standing wave that forms upon reflection of an incident significant wavelength from the VUV wavelength range has a minimum in the region of the at least one oxide layer, wherein the significant wavelength is selected such that the integral over the extinction coefficient of the material of the at least one oxide layer from a minimum wavelength of the VUV wavelength range to the significant wavelength is between 15% and 47%, preferably between 18% and 44%, particularly preferably approximately 33%, of the corresponding integral from the minimum wavelength to a maximum wavelength of the VUV wavelength range. These reflective optical elements can have a lengthened lifetime in conjunction with high reflectivity.

Figure 2:
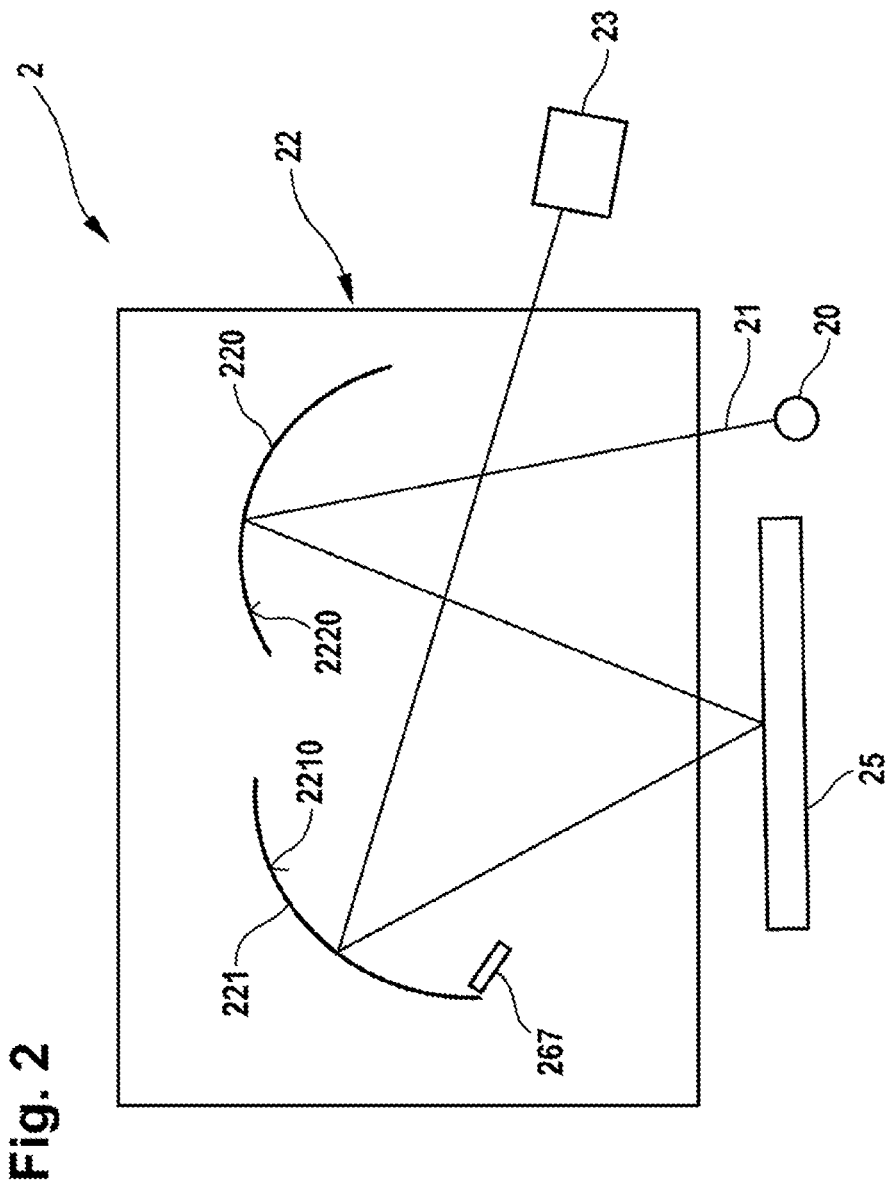
FIG. 2 shows a schematic illustration of a wafer inspection system.

Reflective optical elements of this type can also be used in wafer or mask inspection systems. One exemplary embodiment of a wafer inspection system 2 is illustrated schematically in FIG. 2. The explanations are likewise applicable to mask inspection systems.

The wafer inspection system 2 comprises a radiation source 20, the radiation of which is directed onto a wafer 25 by an optical system 22. For this purpose, the radiation is reflected from a concave mirror 220 onto the wafer 25. In the case of a mask inspection system, a mask to be examined could be arranged instead of the wafer 25. The radiation reflected, diffracted and/or refracted by the wafer 25 is directed onto a detector 23 for further evaluation by a concave mirror 221, which is likewise associated with the optical system 22. The radiation source 20 can be for example exactly one radiation source or a combination of a plurality of individual radiation sources in order to provide a substantially continuous radiation spectrum. In modifications, one or more narrowband radiation sources can also be used. Preferably, the wavelength or the wavelength band is in the range between 100 nm and 200 nm, particularly preferably between 110 nm and 190 nm.

During the operation of VUV lithography apparatuses 1 or wafer or mask inspection systems 2, for example, oxidation of the reflective surfaces 1210, 2210, 2220 of the respective reflective optical elements 121, 220, 221 can occur. In order to lengthen the lifetime thereof, both and optionally further (not illustrated) optical elements of the optical system 22 and the mirror 121 of the lithography apparatus 1 can be configured as described with reference to FIG. 3, 4 or 5.

FIGS. 3, 4 and 5 schematically illustrate possible exemplary embodiments of reflective optical elements 3, 4, 5 for wavelengths in the range of 100 nm to 200 nm, preferably 120 nm to 190 nm. They have respectively a reflective surface 37, 47, 57 which comprises a metal reflective coating in the form of a metal layer 49, 59 in the examples illustrated in FIGS. 4 and 5 and which is formed by a polished surface 32 of a metallic substrate 31 in the example illustrated in FIG. 3. The substrate 31 is advantageously composed of aluminum, copper or aluminum-copper alloy. The metal layer 49, 59 is respectively applied on a substrate 41, 51. It can be applied directly on the substrate 41, 51, or an adhesion promoter layer and/or other functional layers, such as a smoothing layer or a polishing layer, for example, can be provided between the metal layer 49, 59 and the substrate 41, 51. In the exemplary embodiment illustrated in FIG. 4, a functional layer 42 comprising silicon, carbon, aluminum, nickel, cobalt, boron, tantalum, zirconium, tungsten, niobium, molybdenum, vanadium, chromium, copper, titanium, hafnium, their alloys, oxides, nitrides, borides, carbides or other compounds or a combination thereof is arranged between the substrate 41 and the metal layer 49. As polishing layer, in the present example it can preferably be composed of amorphous silicon, carbon, nickel or nickel-phosphorus. As adhesion promoter layer, in the present example it can preferably be composed of one of the materials mentioned above, wherein care should advantageously be taken to ensure sufficient adhesion both to the substrate material and to the metal of the metal layer 49. The substrates 41, 51 are preferably composed of quartz, titanium-doped quartz glass, calcium fluoride, magnesium fluoride, ceramic, glass ceramic, silicon carbide, reaction bonded silicon-silicon carbide composite material, silicon, silicon nitride, silicon oxynitride, aluminum oxide or aluminum oxynitride. They can also be composed of aluminum, copper or aluminum-copper alloy. The metal layer 49, 59 is preferably aluminum, an aluminum-silicon alloy, an aluminum-manganese alloy, an aluminum-silicon-manganese alloy, rhodium, ruthenium, palladium, osmium, iridium, platinum, magnesium or a combination thereof.

In order to protect the metal layer 49, 59 and/or the metallic surface 32, provision is made of at least two layers 33, 35, 43, 45, 53, 55 composed of metal fluoride and/or oxide, preferably metal oxide or silicon dioxide. In the present example, these two layers can be applied through atomic layer deposition and have layer thicknesses such that the electric field of a standing wave that forms upon reflection of the incident operating wavelength has a minimum in the region of the oxide layer. Atomic layer deposition allows particularly thin and smooth layers to be deposited, and losses of reflectivity, on account of absorption and scattering, to be hereby reduced. This makes it possible to apply oxide layers that are even just a few nanometers thick, which afford better protection against oxidation in comparison with the conventional metal fluorides, but have a higher absorption than metal fluorides at many wavelengths in the range sought. Overall, layers applied with atomic layer deposition are moreover particularly dense and hence more resistant to oxidation, for example, than layers of the same material but having a lower density. Alternatively or additionally, the absorption of the at least one oxide layer can be significantly reduced by positioning the layer in a region of low field strength, with the result that the protective function of the oxide can be utilized particularly well. Since particularly thin layers can be produced with atomic layer deposition, as a result the at least one oxide layer can be positioned particularly precisely at a node of the standing wave that forms upon reflection. Besides atomic layer deposition, other coating processes are also suitable, such as, for instance, magnetron sputtering, ion-assisted deposition, plasma-enhanced deposition, thermal evaporation, etc. The possibility of using oxide layers as protective layers on reflective optical elements for the VUV wavelength range opens up unexpected possibilities for making available reflective optical elements which have good lifetimes even with high intensity irradiation.

Preferably, a metal fluoride layer 33, 43, 53 is arranged on the substrate side and an oxide or a metal oxide layer 35, 45, 55 is arranged on the side of said metal fluoride layer facing away from the substrate. What is particularly suitable as metal fluoride is magnesium fluoride, aluminum fluoride, sodium fluoride, lithium fluoride, chiolite, cryolite, erbium fluoride, neodymium fluoride, gadolinium fluoride, dysprosium fluoride, samarium fluoride, holmium fluoride, hafnium fluoride, lanthanum fluoride, europium fluoride, lutetium fluoride, cerium fluoride, barium fluoride, yttrium fluoride or a combination thereof. What is particularly suitable as oxide is silicon dioxide, fluorine-doped silicon dioxide, aluminum oxide, magnesium oxide, lutetium oxide, calcium oxide, hafnium oxide, germanium oxide, zirconium oxide, tin oxide, zinc oxide, barium oxide, yttrium oxide, scandium oxide or a combination thereof. The oxide of the second layer makes it possible to achieve a particularly good protective function including of the underlying first layer composed of metal fluoride, wherein the reflectivity can be optimized by adapting the thicknesses of the first and second layers, in particular by positioning the oxide layer at a minimum of the electric field of a standing wave that forms upon reflection of the radiation.

In contrast to the examples illustrated in FIG. 3 and FIG. 4, in the example illustrated in FIG. 5, not just respectively one metal fluoride layer and one oxide layer are provided, but rather three metal fluoride layers 53 and two oxide layers 55, which are arranged alternately. In different variants, either two, three, four or five of these layers may have been applied with atomic layer deposition, for example. In this case, provision is made for the thicknesses of the layers 53, 55 on the side of the metal layer 59 facing away from the substrate to be selected such that the electric field of a standing wave that forms upon reflection of the incident operating wavelength has a minimum in each case in the region of at least one, preferably both, of the oxide layers 55. The layers 53, 55 together form a dielectric layer system that can serve to increase the reflectivity. In variants, it is also possible to provide more than five layers or to dispense with the metal layer 59. In further variants, a dielectric layer system can be provided which comprises, as materials having different refractive indices at an operating wavelength, materials different than those of the first and second layers. More than respectively one metal fluoride layer or one oxide layer can involve layers composed of exactly one metal fluoride or oxide, respectively, or partly or completely different metal fluorides or oxides, respectively.

FIG. 6 illustrates purely by way of example a further embodiment of a reflective optical element 6 having a reflective surface. To that end, a metal layer 69 is provided on a substrate 61 and a dielectric layer system composed of conventionally applied metal fluoride layers 63', 63" is provided on the side of the metal layer facing away from the substrate. As final sealing with respect to the surroundings, provision is made of a further metal fluoride layer 63 on the substrate side and an oxide layer 65 facing away from the substrate, wherein these two layers are applied by with atomic layer deposition in the present example.

All these discussed embodiments of reflective optical elements are designed such that the thicknesses of the layers on the side of the metal layer facing away from the substrate are selected such that the electric field of a standing wave that forms upon reflection of an incident significant wavelength from the VUV wavelength range has a minimum in the region of the at least one oxide layer, wherein the significant wavelength is selected such that the integral over the extinction coefficient of the material of the at least one oxide layer from a minimum wavelength of the VUV wavelength range to the significant wavelength is between 15% and 47%, preferably between 18% and 44%, particularly preferably approximately 33%, of the corresponding integral from the minimum wavelength to a maximum wavelength of the VUV wavelength range, in order to have both a good lifetime and a good reflectivity.

Figure 7:
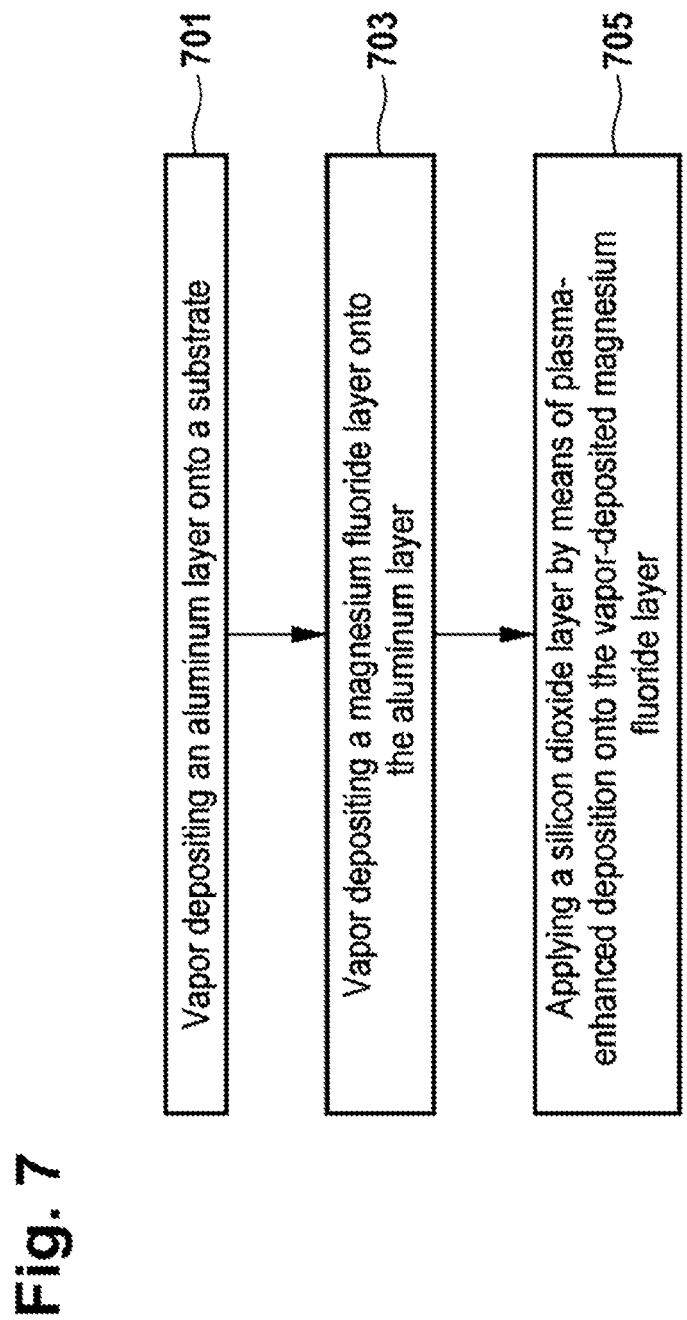
FIG. 7 shows the sequence of one embodiment of the production method.

FIG. 7 illustrates by way of example the sequence of one embodiment of the method proposed here for producing a reflective optical element for an operating wavelength in the VUV wavelength range. In a first step 701 "vapor depositing an aluminum layer onto a substrate", aluminum is applied to a substrate by heating in a vacuum, that is to say by thermal vapor deposition. Depending on the substrate material, the substrate surface may previously have been provided with an adhesion promoter and/or a smoothing layer.

In a second step 703 "vapor depositing a magnesium fluoride layer onto the aluminum layer", a magnesium fluoride layer is applied in order to avoid contamination of the surface of the substrate or rather of the metal layer during handling and transport before introduction into the coating chamber for atomic layer deposition. To that end, the magnesium fluoride is likewise applied by a thermal vapor deposition, which can be carried out in the same coating chamber as the preceding step. By way of the thickness of the magnesium fluoride layer it is possible to make a contribution to the fact that the electric field of a standing wave that forms upon reflection of an incident significant wavelength has a minimum in the region of the oxide layer. If exactly one operating wavelength is employed, the significant wavelength is equal to the operating wavelength. If a plurality of wavelengths or—as often happens—a wavelength band is employed, it is recommended to select, as the significant wavelength, in particular a shorter wavelength from the wavelengths or from within the wavelength band, since the reflectivity is more likely to be impaired at shorter wavelengths by the at least one oxide layer. In particular, the significant wavelength can be selected such that the integral over the extinction coefficient of the material of the at least one oxide layer from a minimum wavelength of the VUV wavelength range to the significant wavelength is between 15% and 47%, preferably between 18% and 44%, particularly preferably approximately 33%, of the corresponding integral from the minimum wavelength to a maximum wavelength of the VUV wavelength range. If consideration is given for example to silicon dioxide for the wavelength range of 120 nm to 190 nm, a significant wavelength of approximately 124 nm results hereby. For aluminum oxide, a significant wavelength of approximately 130 nm results hereby for said wavelength range. The total reflectivity can be increased further by the significant wavelength being determined through mathematical optimization methods in which, for example, the optical constants of the layer materials used and the layer thicknesses thereof are taken into account and optionally varied for as many wavelengths as possible in the operating wavelength range.

In a third step 705 "applying a silicon dioxide layer by means of plasma-enhanced deposition onto the vapor-deposited magnesium fluoride layer", as protection of the aluminum layer and of the magnesium fluoride layer against oxidation, in particular, an oxide layer is applied as a final seal with respect to the surroundings or with respect to the vacuum. The plasma-enhanced deposition results in particularly dense and thus resistant layers. Moreover, the layer thickness can be controlled well. In variants, in all coating steps, it is also possible to select other types of coating such as, for instance, for example inter alia magnetron sputtering, ion-assisted deposition, plasma-enhanced deposition instead of thermal evaporation, thermal evaporation instead of plasma-enhanced deposition, etc.

Figure 8:
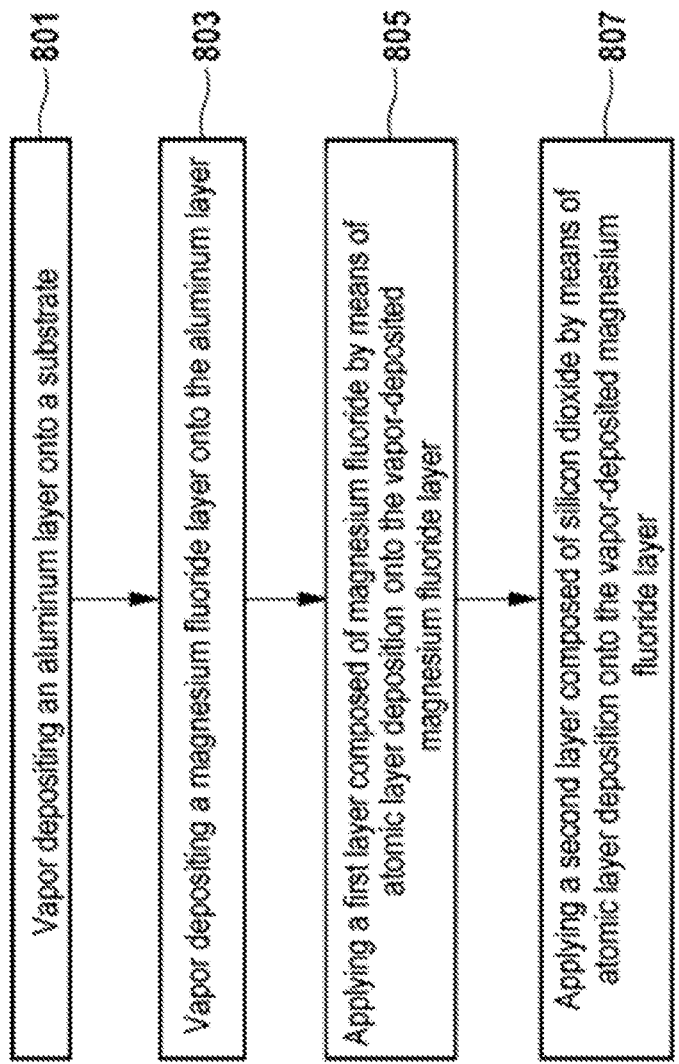
FIG. 8 shows the sequence of a further embodiment of the production method.

FIG. 8 illustrates by way of example the sequence of a further embodiment of the method proposed here for producing a reflective optical element for an operating wavelength in the VUV wavelength range. In a first step 801 "vapor depositing an aluminum layer onto a substrate", aluminum in the example illustrated here is applied to a substrate by heating in a vacuum. Depending on the substrate material, the substrate surface may previously have been provided with an adhesion promoter and/or a smoothing layer.

In a second step 803 "vapor depositing a magnesium fluoride layer onto the aluminum layer", before the first layer is applied, a magnesium fluoride layer is applied in order to avoid contamination of the surface of the substrate or rather of the metal layer during handling and transport before introduction into the coating chamber for atomic layer deposition. To that end, the magnesium fluoride in the example illustrated here is heated in a vacuum, which can be carried out in the same coating chamber as the preceding step.

The substrate coated with aluminum and magnesium fluoride is then brought into a further coating chamber in order to carry out steps 805 "applying a first layer composed of magnesium fluoride by means of atomic layer deposition onto the vapor-deposited magnesium fluoride layer" and 807 "applying a second layer composed of magnesium oxide by means of atomic layer deposition onto the applied magnesium fluoride layer". In variants, these two steps 805 and 807 can be repeated as often as desired. In further variants, in addition or as an alternative to the aluminum layer, a dielectric layer system can be applied before or after the first and second layers are applied, wherein the dielectric layer system comprises at least one layer composed of a material having a lower refractive index at the operating wavelength and at least one layer composed of a material having a higher refractive index at the operating wavelength, in order to influence the optical properties of the reflective optical element in a targeted manner. To that end, for the layers it is possible to use the materials of the first and second layers or else to select other materials.

Figure 9:
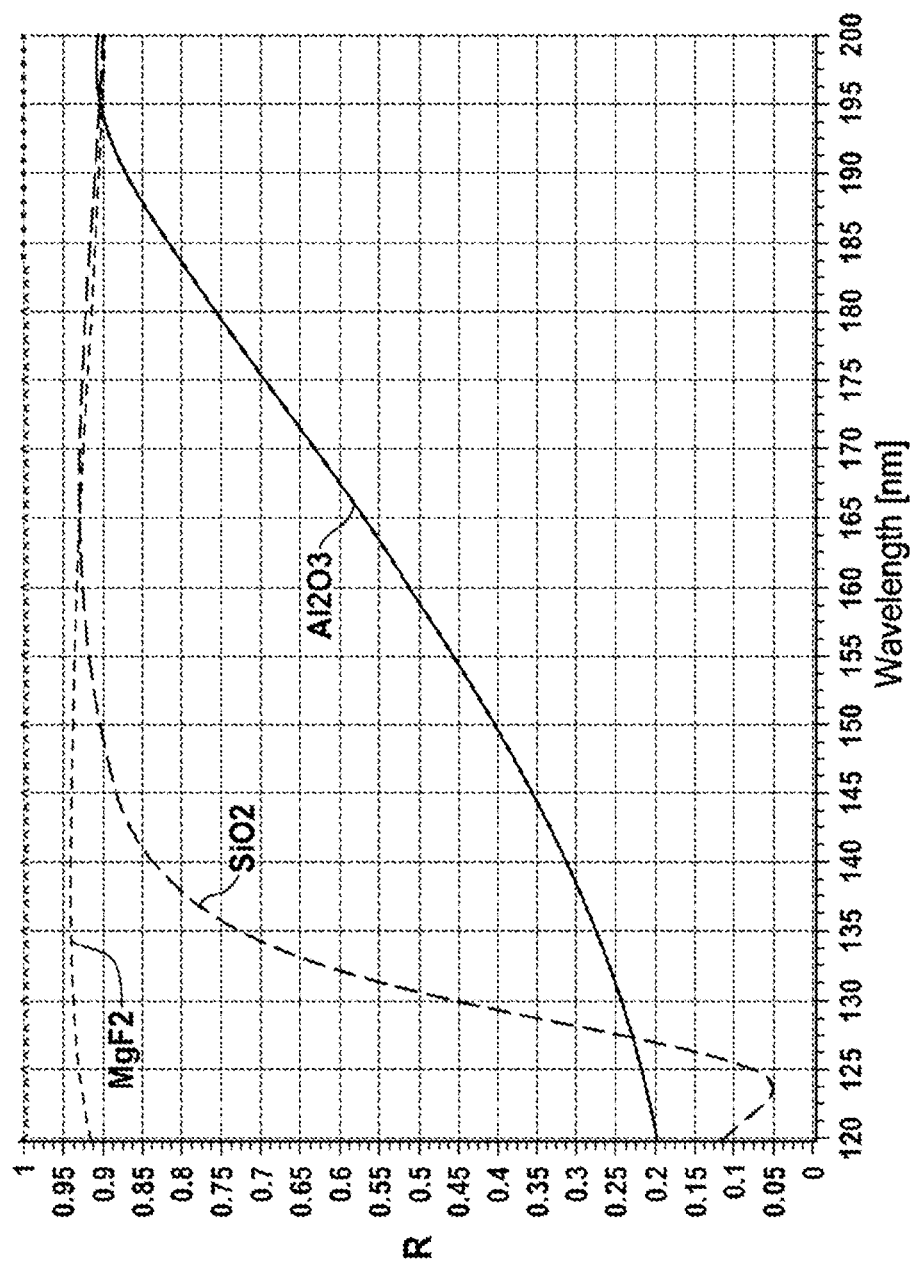
FIG. 9 shows the reflectivity of a reflective optical element as a function of the wavelength for various materials on a metal layer.

In FIG. 9, the reflectivity is plotted as a function of the wavelength between 120 nm and 200 nm for various mirrors, all of which have an aluminum reflective coating. An uncoated and unoxidized aluminum surface would achieve a reflectivity of ideally up to 0.92 over the entire wavelength range. However, an aluminum oxide layer would form in a very short time as a result of oxidation, said layer's reflectivity (identified by $Al_2O_3$), toward shorter wavelengths, decreasing continuously down to a value of just 0.2. A protective layer composed of magnesium fluoride allows the reflectivity to be kept at more than 0.9 throughout (identified by MgF2). However, it has been found that at the radiation intensities required in lithography and in the inspection of wafers and masks, after just a few hours, despite a protective layer composed of magnesium fluoride, oxidation of the aluminum surface can be observed, which results in a great decrease in reflectivity. Aluminum mirrors have a longer lifetime if they have a silicon dioxide protective layer, for example. However, silicon dioxide absorbs in part very greatly in the wavelength range between 120 nm and 150 nm, which results in a reflectivity in the range between 120 nm and 127 nm (identified by SiO2) which is even below that of an oxidized aluminum mirror.

Figure 10:
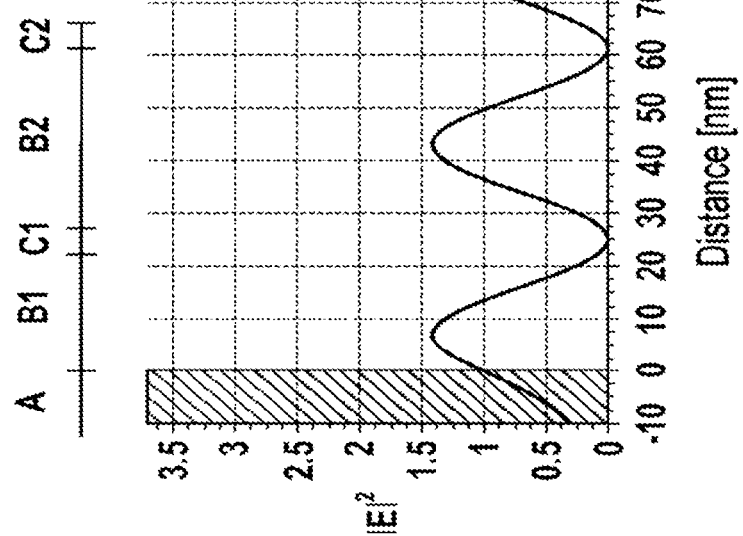
FIG. 10 shows the standing wave that forms upon reflection of radiation having a wavelength of 120 nm, and a first layer arrangement.
Figure 11:
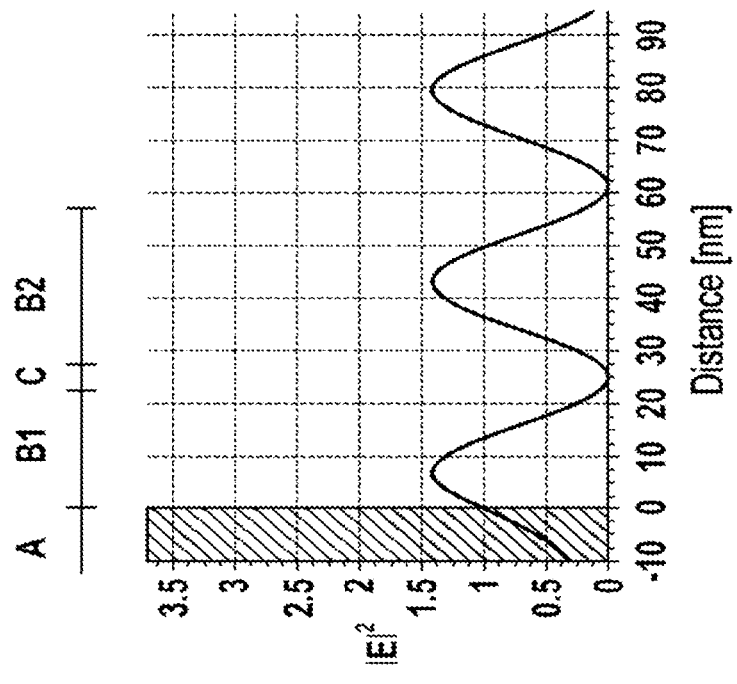
FIG. 11 shows the standing wave that forms upon reflection of radiation having a wavelength of 120 nm, and a second layer arrangement.

In order to minimize the losses of reflectivity in conjunction with a good lifetime, it is therefore proposed, by way of a corresponding selection of thicknesses for the metal fluoride layers, to arrange the oxide layers at a minimum of the field strength of the standing wave that forms upon reflection, where absorption can take place only minimally. In addition, the oxide layer can be applied as thinly and densely as possible. The standing wave that forms upon reflection of radiation of 120 nm at an aluminum surface is illustrated in FIGS. 10 and 11. The aluminum layer goes from negative distances to 0 nm in FIGS. 10, 11. Against that the field distribution, represented as the square of the absolute value of the electric field, oscillates for a period of approximately 38 nm. Two different layer arrangements are depicted schematically by way of example above that. In FIG. 10, a first magnesium fluoride layer B1 is provided on the aluminum layer A, such that the silicon dioxide layer C, which is as thin as possible, is arranged at the first field distribution minimum in front of the aluminum layer at approximately 25 nm, in order to minimize the absorption of the silicon dioxide layer. A further magnesium fluoride layer B2 can be arranged thereabove. In FIG. 11, the second magnesium fluoride layer B2, analogously to the first magnesium fluoride layer B1, has a thickness such that a second thin silicon dioxide layer C2 is likewise arranged at a minimum of the field distribution of the standing waves, at the second minimum in front of the aluminum layer at approximately 61 nm in the example illustrated here.

It should be pointed out that the period of the standing waves that form is dependent on the layer materials used. In this respect, magnesium fluoride should be regarded as having a low refractive index in the VUV wavelength range and results in longer periods, while higher refractive index materials result in shorter periods. In this respect, for example, a comparable representation with, for instance, lanthanum fluoride would have smaller layer thicknesses.

Figure 12:
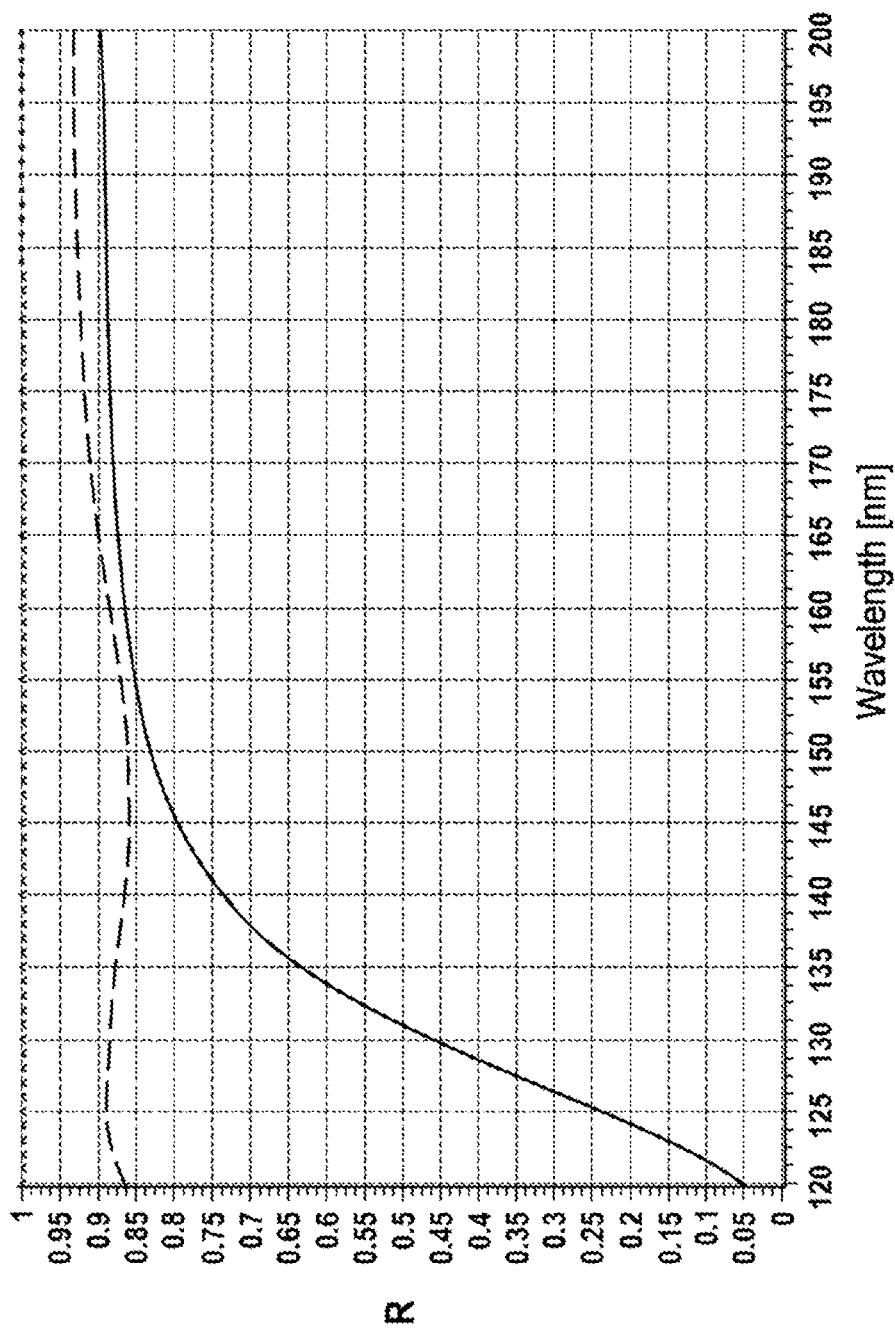
FIG. 12 shows the reflectivity of a reflective optical element as a function of the wavelength for one embodiment of the first layer arrangement from FIG. 9.

FIG. 12 illustrates the reflectivity of a mirror following the layer arrangement from FIG. 9 over the wavelength range of 120 nm to 200 nm. This mirror comprises, on an aluminum layer, a first magnesium fluoride layer of 21 nm, a silicon dioxide layer of 8 nm and a second magnesium fluoride layer of 33 nm. The corresponding reflectivity is depicted as a dashed line. For comparison, the reflectivity of an aluminum mirror coated only with an 8 nm thick silicon dioxide layer is also depicted as a solid line. As a result of the positioning of the silicon dioxide layer in the region of the field strength minima for the wavelengths around 125 nm, even in the short-wave wavelength range it is possible to achieve a reflectivity of more than 0.85 in conjunction with an increased lifetime even at high radiation intensities.

Figure 13:
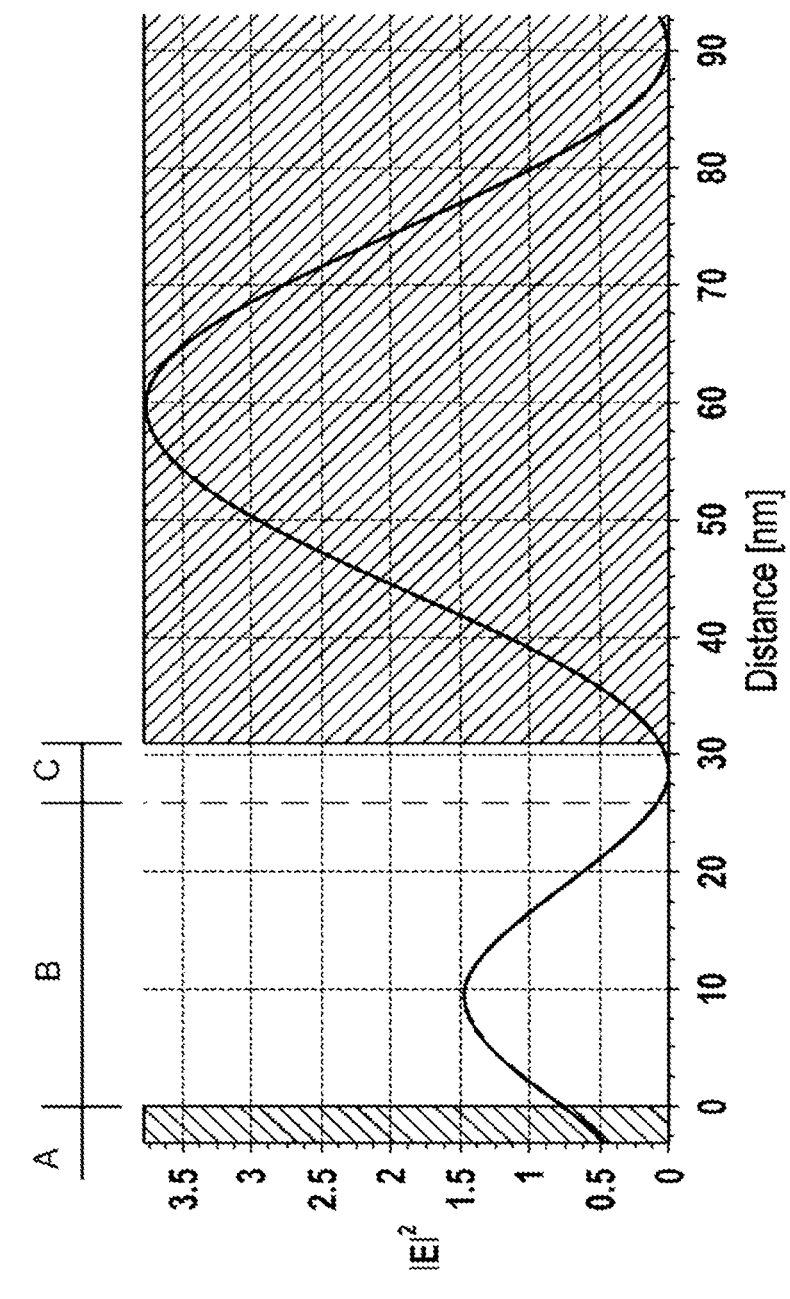
FIG. 13 shows the standing wave that forms upon reflection of radiation having a wavelength of 124 nm, and a third layer arrangement.

FIG. 13 illustrates the standing wave that forms at 124 nm in the case of a reflective optical element having a structure in accordance with FIG. 4. What is involved in this example is a vapor-deposited aluminum reflective coating A having a thickness of 70 nm, thereabove a 26 nm thick magnesium fluoride layer B and a 5 nm thick silicon dioxide layer C, which provides a final seal with respect to the surroundings. Both the magnesium fluoride layer B and the silicon dioxide layer C are applied with atomic layer deposition in the example illustrated here. The layer thicknesses are dimensioned such that the more highly absorbent silicon dioxide layer C is situated where the standing wave has a minimum.

Figure 14:
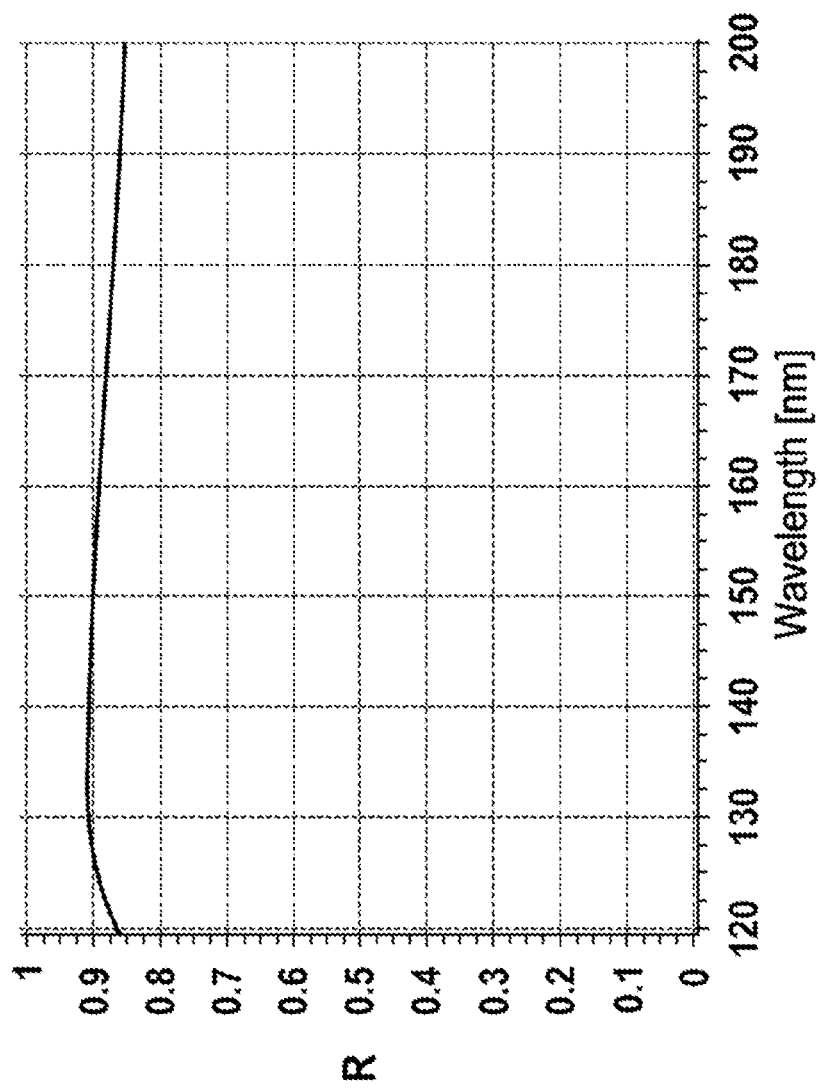
FIG. 14 shows the reflectivity of a reflective optical element as a function of wavelength for one embodiment of the third layer arrangement from FIG. 13.

The reflectivity in the case of normal incidence of this reflective optical element over the wavelength range of 120 nm to 200 nm is illustrated in FIG. 14 and is substantially between 90% and 85% over this entire wavelength range. It should be pointed out that in the case of the corresponding reflective optical element in accordance with FIG. 3, that is to say for example with an aluminum substrate and without a dedicated metal reflective coating composed of aluminum, but with identical magnesium fluoride and silicon dioxide layers, an identical standing wave would form at 124 nm and the reflectivity profile in the case of normal incidence over the wavelength range of 120 nm to 200 nm would be identical.

Figure 15:
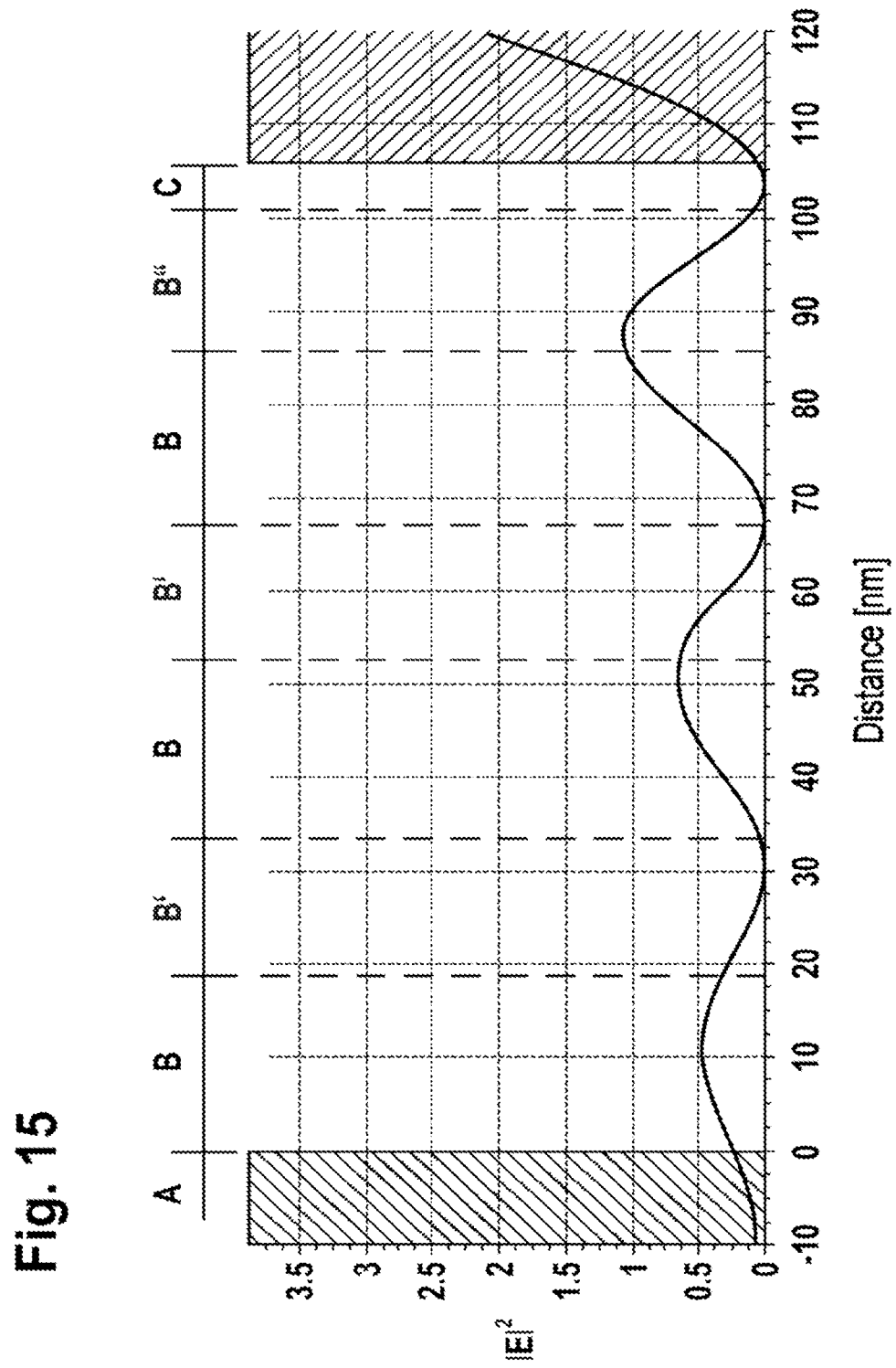
FIG. 15 shows the standing wave that forms upon reflection of radiation having a wavelength of 124 nm, and a fourth layer arrangement.

FIG. 15 illustrates the standing wave that forms at 124 nm in the case of a reflective optical element having a construction in accordance with FIG. 6. Said element has an aluminum reflective coating A (61) having a thickness of 70 nm in the example illustrated here. Applied thereabove is a multilayer system of alternately arranged layers having different refractive indices at 124 nm, namely three layers B composed of vapor-deposited magnesium fluoride 63' having a thickness of 19 nm in each case and two layers B' composed of vapor-deposited lanthanum fluoride 63" having a thickness of 14.5 nm in each case. On the side of said multilayer system facing away from the substrate and the reflective coating A, in the example illustrated here with atomic layer deposition there are a layer B" of lanthanum fluoride 63 having a thickness of 14 nm and a layer C having a thickness of 5 nm composed of silicon dioxide 65, which provides a final seal with respect to the surroundings. The layer thicknesses are dimensioned such that the more highly absorbent silicon dioxide layer C is situated where the standing wave has a minimum.

The reflectivity in the case of normal incidence of this reflective optical element over the wavelength range of 120 nm to 200 nm is illustrated in FIG. 16. Even a reflectivity of more than 90% is achieved in the ranges between approximately 120 nm and approximately 135 nm and from approximately 168 nm to approximately 200 nm. The reflectivity does not fall below 70% in the wavelength range between approximately 135 nm and approximately 168 nm.

In order to optimize the reflectivity for irradiation with broadband radiation, in particular, the significant wavelength is selected such that the integral over the extinction coefficient of the material of the at least one oxide layer from a minimum wavelength of the VUV wavelength range to the significant wavelength is between 15% and 47%, preferably between 18% and 44%, particularly preferably approximately 33%, of the corresponding integral from the minimum wavelength to a maximum wavelength of the VUV wavelength range. From the position of the minima of the standing wave that arises upon reflection of the significant wavelength at the reflective optical element, the at least one oxide layer should be positioned so as to maximize the highest possible reflectivity over the entire bandwidth.

The procedure proposed here both with regard to production and with regard to design allows the provision of reflective optical elements for wavelengths in the range of 100 nm to 200 nm, preferably 120 nm to 190 nm, which as a result of the provision of at least one oxide layer, even when used at relatively high radiation intensities, can have a longer lifetime in conjunction with surprisingly good reflectivity.

REFERENCE SIGNS

1 VUV lithography apparatus
2 Wafer inspection system
3 Reflective optical element
4 Reflective optical element
5 Reflective optical element
6 Reflective optical element
10 Radiation source
11 Radiation
12 Illumination system
13 Mask
14 Projection system
15 Element to be exposed
20 Radiation source
21 Radiation
22 Optical system
23 Detector
25 Wafer 31 Substrate
32 Substrate surface
33 Metal fluoride layer
35 Oxide layer
37 Reflective surface
41 Substrate
42 Functional layer
43 Metal fluoride layer
45 Oxide layer
47 Reflective surface
49 Metal layer
51 Substrate
53 Metal fluoride layer
55 Oxide layer
57 Reflective surface
59 Metal layer
61 Metal fluoride layer
63, 63', 63" Metal fluoride layer
65 Oxide layer
67 Reflective surface
69 Metal layer
120 Lens element
121 Mirror
140 Lens element
141 Lens element
220 Mirror
221 Mirror
701 Method step
703 Method step
705 Method step
801 Method step
803 Method step
805 Method step
807 Method step
1210 Reflective surface
2210 Reflective surface
2220 Reflective surface
A Aluminum layer
B Magnesium fluoride layer
B' Lanthanum fluoride layer (vapor-deposited)
B" Lanthanum fluoride layer (applied with atomic layer deposition)
B1 Magnesium fluoride layer
B2 Magnesium fluoride layer
C Silicon dioxide layer
C1 Silicon dioxide layer
C2 Silicon dioxide layer

What is claimed is:

1. A reflective optical element for a vacuum ultraviolet (VUV) wavelength range, comprising:
a substrate and a metal layer thereon,
at least one metal fluoride layer on a side of the metal layer facing away from the substrate, and
at least one oxide layer on a side of the metal fluoride layer facing away from the substrate,
wherein thicknesses of the layers on the side of the metal layer facing away from the substrate are selected such that an electric field of a standing wave that forms upon reflection of an incident significant wavelength from the VUV wavelength range has a minimum in a region of the at least one oxide layer,
wherein the significant wavelength is selected such that an integral over an extinction coefficient of a material of the at least one oxide layer from a minimum wavelength of the VUV wavelength range to the significant wavelength is between 15% and 47% of a corresponding integral from the minimum wavelength to a maximum wavelength of the VUV wavelength range, wherein the extinction coefficient of the material comprises a function of wavelength across the VUV wavelength range.

2. The reflective optical element as claimed in claim 1, wherein the metal layer consists essentially of aluminum, an aluminum-silicon alloy, an aluminum-manganese alloy, an aluminum-silicon-manganese alloy, rhodium, ruthenium, palladium, osmium, iridium, platinum, magnesium or some combination thereof.

3. The reflective optical element as claimed in claim 1, wherein the metal fluoride layer consists essentially of magnesium fluoride, aluminum fluoride, sodium fluoride, lithium fluoride, chiolite, cryolite, erbium fluoride, neodymium fluoride, gadolinium fluoride, dysprosium fluoride, samarium fluoride, holmium fluoride, hafnium fluoride, lanthanum fluoride, europium fluoride, lutetium fluoride, cerium fluoride, barium fluoride, yttrium fluoride or some combination thereof.

4. The reflective optical element as claimed in claim 1, wherein the oxide layer consists essentially of silicon dioxide, fluorine-doped silicon dioxide, aluminum oxide, magnesium oxide, lutetium oxide, calcium oxide, hafnium oxide, germanium oxide, zirconium oxide, tin oxide, zinc oxide, barium oxide, yttrium oxide, scandium oxide or some combination thereof.

5. The reflective optical element as claimed in claim 1, wherein the substrate consists essentially of quartz, titanium-doped quartz glass, calcium fluoride, magnesium fluoride, ceramic, glass ceramic, silicon, silicon carbide, silicon-silicon carbide composite material, aluminum, copper or aluminum-copper alloy.

6. The reflective optical element as claimed in claim 1, further comprising a functional layer arranged between the substrate and the metal layer.

7. The reflective optical element as claimed in claim 6, wherein the functional layer is embodied as an adhesion promoter layer or a polishing layer.

8. The reflective optical element as claimed in claim 6, wherein the functional layer consists essentially of silicon, carbon, aluminum, nickel, cobalt, boron, tantalum, zirconium, tungsten, niobium, molybdenum, vanadium, chromium, copper, titanium, hafnium, or their alloys, oxides, nitrides, borides, carbides or other compounds, or some combination thereof.

* * * * *

UNITED STATES PATENT AND TRADEMARK OFFICE
CERTIFICATE OF CORRECTION

| | | |
|---|---|---|
| PATENT NO. | : 11,520,087 B2 | Page 1 of 1 |
| APPLICATION NO. | : 17/145879 | |
| DATED | : December 6, 2022 | |
| INVENTOR(S) | : Forcht et al. | |

It is certified that error appears in the above-identified patent and that said Letters Patent is hereby corrected as shown below:

In the Specification

Column 5, Line 48, delete "arrangments" and insert -- arrangements --.

Signed and Sealed this
Twentieth Day of June, 2023

Katherine Kelly Vidal
*Director of the United States Patent and Trademark Office*